March 23, 1943.　　　R. T. KELLER　　　2,314,710
COMBINED TAIL LAMP AND GAS TANK FILLING VENT
Filed March 30, 1940
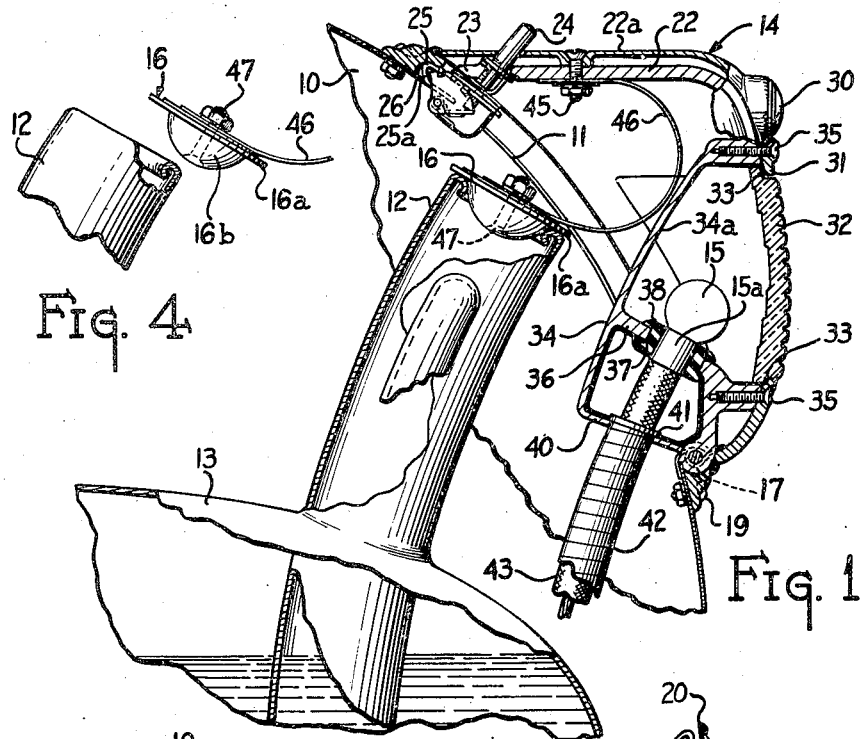
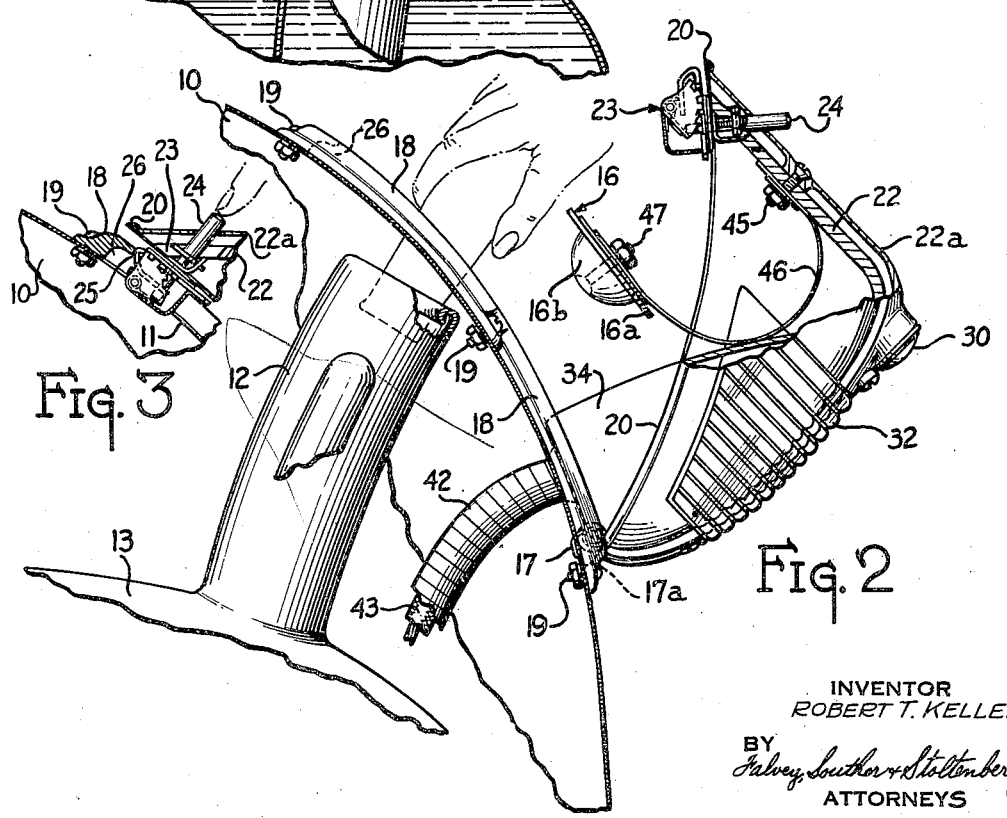
INVENTOR
ROBERT T. KELLER
BY
ATTORNEYS Patented Mar. 23, 1943

2,314,710

UNITED STATES PATENT OFFICE 2,314,710

COMBINED TAIL LAMP AND GAS TANK FILLING VENT

Robert T. Keller, Royal Oak, Mich., assignor to Chrysler Corporation, Highland Park, Mich., a corporation of Delaware Application March 30, 1940, Serial No. 327,069

5 Claims. (Cl. 240—8.3)

This invention relates to closure means, more particularly to a movable tail lamp housing which also serves to close the filling vent of the gasoline tank of an automobile.

In the usual type of closure member for gasoline tanks of automobiles comprising a rotatable cap, the carelessness of gasoline station attendants often results in its loss because of failure to replace the cap or failure to properly position it on the filling vent, so that road shocks attending the operation of the car cause the cap to shake loose. Another disadvantage of the usual type of closure is that the cap detracts from the streamline contour of the fender or other portion of the body where the cap is located.

The present invention contemplates the provision of a filling vent which obviates these difficulties. A structure is provided in which it is substantially impossible to lose the closure member of the filling vent inasmuch as it is permanently attached to the body portion of the automobile. At the same time, the present invention provides a means whereby the filling spout of the gasoline tank cooperates with a housing in which is positioned one of the tail lamps, which is capable of being designed in a manner to present an agreeable outline which enhances the appearance of the automobile. The present invention has the further advantage that it allows the combination of the filling vent and the tail lamp housing in such a manner that the filling vent may be positioned at a convenient angle, so that a gasoline station attendant will be prevented from marring the body portions of the automobile.

It is, therefore, a principal object of this invention to provide a closure means for a gasoline tank of an automotive vehicle which is combined with a housing for a tail lamp thereof, so that an attractive closure device is obtained.

It is a further object of this invention to provide a closure means for a filling vent of a gasoline tank of an automobile wherein the closure member is permanently attached to the body of the car.

It is a further object of this invention to provide a closure member for the filling vent of a gasoline tank of an automotive vehicle which is capable of being fabricated as a unitary construction, so that it may be conveniently attached in position in the mass production whereby one unitary assembly serves a dual function of providing a housing for the rear tail lamp and, at the same time, forms a closure member for the gasoline tank.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1 is a sectional elevation showing the closure member in normal operating position wherein the filling vent of the gasoline tank is closed.

Figure 2 is a view similar to Figure 1 showing the members in open position.

Figure 3 is a sectional elevation of the cooperative elements of a latch means.

Figure 4 is an elevational view, partly in section, showing the relation, during the closing operation, of the closure member and the filling vent.

Referring to the drawing, particularly to Figure 1, a body portion 10 is shown, preferably located adjacent the rear portion of the body of an automobile and may be a fender if desired, which is provided with an aperture 11 of sufficient size to give convenient access to a filling vent 12 of a standard gasoline tank 13 with which the filling vent 12 is in communication. The details of construction of the filling vent 12 and the gas tank or other fluid container are well known and need not be described in detail.

The aperture 11 in the body portion 10 is preferably positioned to open to the rear of the automobile, so that it may be conveniently provided with a unitary housing construction 14 which is adapted to house an electric lamp 15 and also to cover the aperture 11 to form a weather-proof connection therewith. The unitary assembly 14 is also provided with a plug-like closure member 16 which is adapted to close the terminus of the filling vent 12 when the housing is in closed position. The terminus of the filling vent 12 is located adjacent the aperture 11, so that the movements of the closure member 16 may be controlled by the movement of the housing 14 to expose the open end of the terminus of the filling vent 12 for convenient cooperation with the filling spout of a gasoline pump as is clearly shown in Figure 2 where the housing is displaced from closing position with the aperture.

In order that the housing 14 may be conveniently moved from its closed position, clearly illustrated in Figure 1, a pivot or hinge means 17 is provided which cooperates with the movable portion of the housing 14 adjacent its lower end and also with a fixed portion 18 which is conveniently attached to the body portion 10 by means of bolts 19 threading apertures in the fixed member 18 and in the body portion 10. The fixed member 18 is provided with an opening which is preferably coincident with the aperture 11 in the body member, so that the filling spout of a gasoline pump may be readily inserted through the aperture to cooperate with the filling vent 12 as has already been described. A gasket means 20 is provided on the edge of the movable portion of the housing 14, so that when it is in closed position in cooperative relation with the fixed member 18, a weather-tight joint is formed therebetween to prevent water or other extraneous material from entering the interior of the body.

Housing 14, which is movable about the pivot or hinge means 17, is preferably formed with an inner stress-bearing member 22 in the general shape of an inverted L which cooperates at its lower end with the hinge or pivot means 17. Adjacent the other end of the stress-bearing member 22, a latching device 23 is provided which may be of any well known design incorporating a manual press-button 24 to actuate a latching bar 25 when depressed to disengage the latching bar 25 from a slot 26 formed on the lower side of the fixed member 18 at a point substantially aligned with the hinge member 17. The latch member 23 is of the spring type, so that the push button 24 is thrust outwardly to extend to the outside of the housing 14 by the action of a resilient means in a manner well known in the art, so that when the housing 14 is thrust into cooperative relation with the fixed member 18, a cam surface 25a will allow the latch bar 25 to spring into cooperative relation with the slot 26 to form the locking relation between the movable portion of the housing 14 and the fixed portion 18. Cooperating with the hinge means 17, and preferably a part thereof, a stop means 17a is provided which limits the extent to which the housing 14 may be opened.

Adjacent the apex of the L-shaped member 22, an autocollimating device 30 is provided to reflect impinging light rays from the lights of another automobile approaching from the rear to serve as a warning signal. Immediately below the autocollimating device, an aperture 31 is provided in the housing 14 in which a U-shaped glass member 32 is positioned, preferably of ruby glass, to give forth a rear signal when the lamp 15 is illuminated directly therebehind, as is clearly shown in Figure 1. The glass member 32 may be conveniently held in position by notches 33 which cooperate with the edges of the aperture 31.

An inner housing 34 is provided to hold the lamp 15 in proper relation with the ruby glass 32 and may be held in position in the L-shaped member 22 by means of screws 35. The housing may be provided on its inner surface 34a with a reflecting substance so as to increase the efficiency of a rear signal given by the lamp 15. A partition 36 is provided which may obliquely cut the housing 34 into two chambers, the upper of which contains the lamp 15 and terminates adjacent the lower end of the ruby glass 32. The partition 36 is provided with an aperture 37 in which is positioned a rubber grommet 38 which embraces a socket member 15a of the lamp 15 so as to hold the latter firmly in position behind the ruby glass 32. The floor 40 of the housing 34 is provided with an aperture 41 into which projects a conduit 42 to house a connecting lead 43 from the socket 15a of the lamp 15. The conduit 42 is firmly fixed in position in the floor 40 by soldering or the like and projects inwardly so as to be invisible from the outside of the body member 10.

For purposes of improving the appearance of the housing 14, an outer shell 22a is provided which is preferably chrome-plated or otherwise highly finished on its exterior. The outer shell 22a embraces the housing 14 and is held in position on the supporting member 22 by means of a bolt 45 and toward the rearward portion of the housing 14 by means of screws 35 which also hold the inner housing 34 in position. The outer shell 22a is provided with apertures which are coincident with the face of the autocollimating device 30 and the ruby glass 32 so as to provide a neat-appearing construction.

The bolt 45, which holds the outer shell 22a in position, also provides a fastening means for one end of a spring member 46 which has attached to its other end the closure member 16 by means of a bolt 47. The resilient spring member 46 is given a semi-circular shape and is adapted to place a downward thrust upon the closure member 16 so as to place a compression upon a gasket member 16a to provide a liquid-proof joint between the closure member and the filling vent to prevent the gasoline from splashing out of the filling vent during the normal running operation of the automobile.

Referring to Figure 4, the closure member 16 is shown at an intermediate position between the open and closed position, showing the method whereby the closure member attains its seating relation with the terminus of the filling vent 12. The closure member 16 is provided with a centering dome 16b which is also held in position by means of the bolt 47, the head of the bolt 47 being preferably countersunk into the dome 16b to facilitate the closing operation.

The normal operating position of the invention is shown in Figure 1 in which the latch member 23 holds the housing 14 in weather-tight relation with the fixed member 18 which is attached to the body member 10. With the housing 14 in this position, the closure member 16 is tightly thrust against the terminus of the filling vent 12 to form a leak-proof joint therebetween to prevent gasoline from splashing out during the operation of the automobile and the ruby glass 32 faces rearwardly of the body portion to provide a rear signaling device when the lamp 15 is illuminated. The autocollimating device 30, positioned above the ruby glass 32, also faces rearwardly to reflect the rays of light impinged thereupon.

When the automobile requires a new supply of fuel in the gasoline tank, the attendant of the gas station depresses the push button 24, as shown in Figure 3, to release the latching bar 25 from its cooperative relation with the notch 26 to allow the housing 14 to move about the pivot 17 to the position shown generally in Figure 2 in which the closure member 16 is completely removed from its cooperative relation with the terminus of the filling vent 12, so that ready access may be obtained to the filling vent through the aperture 11 by the filling spout of the gasoline pump in the hands of the attendant. After the filling operation is complete, the gas station attendant removes the filling spout from the filling vent 12 and thrusts the housing 14 back into its cooperative relation with the fixed member 18 to again place the latching bar 25 in position to hold the parts in cooperative relation in the position shown in Figure 1. During the movement of the housing 14 from the position shown in Figure 2 to the position shown in Figure 1, the closure member 16 passes through the phase illustrated in Figure 4 just prior to the time the centering device 16b enters the terminus of the filling vent 12. When the latch is again locked, the parts are again in normal operating position as shown in Figure 1.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a body portion having an aperture, a tank within the body portion having a filling vent terminating adjacent the aperture, a removable cover means for the filling vent, a supporting means fixed on the body portion surrounding the aperture, a movable tail light housing cooperating with the supporting means to close the aperture in the body portion, hinge means between the housing and the supporting means to allow the housing to be moved from its cooperative relation with the supporting means to expose the aperture, resilient means on the housing to mount the removable cover means to open and close the vent means when the housing is moved about the hinge means to open and close the aperture in the body, and manually operable latch means to maintain the housing and the supporting means in cooperative relation to close the aperture.

2. In a device of the class described, a body portion having an aperture, a tank positioned within the body portion and having a filling vent cooperating with the aperture, movable cover means to open and close the filling vent, a pivot means, a tail light housing cooperating with the pivot means and adapted to open and close the aperture in the body portion, means resiliently attaching the cover means to the housing to open and close the filling vent in synchronism with the opening and closing of the aperture by the tail light housing, and manually operable latch means to hold the housing and the cover means in closed position.

3. In combination with an automobile body portion having an aperture, and having an open-ended filling tube adjacent to and in alignment with said aperture, means for closing said aperture and said filling tube comprising a tail light housing hingedly supported on said body portion and adapted to assume aperture-closing and aperture-exposing positions, a closure for said filling tube resiliently supported by said housing whereby when said housing is moved to the aperture closing position said closure will close the open end of said filling tube and when said housing is swung to the aperture-exposing position, said closure will be moved away from said filling tube, and manually operated latch mechanism for holding said housing in the aperture-closing position.

4. In combination with an automobile body portion having an aperture, and having an open-ended filling tube adjacent to and in alignment with said aperture, means for closing said aperture and said filling tube comprising a unitary tail light assembly consisting of a stationary member secured to said body portion and surrounding said aperture and a lamp-receiving movable housing member pivoted to said stationary member and adapted to be swung into one position to close said aperture and into another position to expose said aperture, closure means for said filling tube resiliently supported by said movable housing member whereby movement of said movable housing member to open and close said aperture will likewise effect opening and closing of said filling tube, and manually operated latch mechanism for holding said movable housing member and said closure member in the closed position.

5. A unitarily-assembled tail light housing and gas tank closure member adapted for rapid installation and for enhancing the appearance of an automobile comprising an apertured stationary portion adapted to be secured to an apertured portion of an automobile body adjacent an open-ended fuel tank filling tube, said apertures and said tube being in registry, a movable lamp-receiving housing portion pivoted at one edge to said stationary portion and adapted to be moved into aperture closing and opening positions, a closure member for said filling tube, a resilient closure-supporting member secured at one end to said closure member and at the other end to said movable housing portion, whereby when said movable housing portion is in the aperture-closing position said closure-supporting member extends through said aperture to hold said closure member on said filling tube, and when said movable housing portion is moved to the open position said closure-supporting member will move said closure member through said apertures and clear of said filling tube to permit the introduction of fuel into said tank.

ROBERT T. KELLER.